(12) United States Patent
Denker

(10) Patent No.: US 6,404,513 B1
(45) Date of Patent: *Jun. 11, 2002

(54) JOB ID FOR FAX FORWARDING

(75) Inventor: John Stewart Denker, Leonardo, NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/009,771

(22) Filed: Jan. 20, 1998

Related U.S. Application Data

(60) Provisional application No. 60/036,059, filed on Jan. 30, 1997.

(51) Int. Cl.[7] .................................................. H04N 1/00
(52) U.S. Cl. ........................ 358/407; 358/434; 358/439; 358/442; 358/468
(58) Field of Search ................................ 358/402, 403, 358/405, 407, 468, 434, 444, 437, 440, 442, 439, 1.15, 400; 379/100.01, 100.09

(56) References Cited

U.S. PATENT DOCUMENTS

| | | | |
|---|---|---|---|
| 4,586,086 A | | 4/1986 | Ohzeki |
| 4,630,196 A | * | 12/1986 | Bednar, Jr. et al. ...... 395/200.32 |
| 4,956,860 A | | 9/1990 | Murata |
| 5,068,888 A | | 11/1991 | Scherk et al. |
| 5,084,770 A | | 1/1992 | Nakayama |
| 5,090,049 A | | 2/1992 | Chen |
| 5,127,047 A | * | 6/1992 | Bell et al. ............... 379/100.06 |
| 5,155,601 A | | 10/1992 | Toyama |
| 5,175,634 A | | 12/1992 | Matsuzaki |
| 5,216,706 A | * | 6/1993 | Nakajima ............... 379/102.02 |
| 5,283,665 A | | 2/1994 | Ogata |
| 5,289,582 A | * | 2/1994 | Hirata et al. ................. 358/400 |
| 5,291,302 A | * | 3/1994 | Gordon et al. ............... 358/400 |
| 5,307,178 A | * | 4/1994 | Yoneda ........................ 358/440 |
| 5,357,245 A | * | 10/1994 | Hagiwara ............... 340/825.52 |
| 5,404,231 A | * | 4/1995 | Bloomfield ................. 358/400 |
| 5,452,099 A | * | 9/1995 | Von Meister ............... 358/403 |
| 5,459,584 A | | 10/1995 | Gordon et al. |
| 5,493,408 A | | 2/1996 | Kurogane et al. |
| 5,508,817 A | * | 4/1996 | Kunigami ................... 358/402 |
| 5,555,100 A | * | 9/1996 | Bloomfield et al. ......... 358/402 |
| 5,579,126 A | | 11/1996 | Otsuka |
| 5,585,854 A | | 12/1996 | Makino |
| 5,633,731 A | * | 5/1997 | Maemura .................... 358/468 |
| 5,657,136 A | * | 8/1997 | Maei et al. .................. 358/468 |
| 5,669,040 A | | 9/1997 | Hisatake |
| 5,757,511 A | * | 5/1998 | Kaneyama .................. 358/403 |
| 5,826,034 A | * | 10/1998 | Albal .......................... 709/239 |
| 5,881,136 A | * | 3/1999 | Tasker et al. .......... 379/100.09 |
| 5,892,587 A | * | 4/1999 | Okada et al. ............... 358/402 |
| 5,940,187 A | * | 8/1999 | Berke ......................... 358/434 |
| 6,011,968 A | * | 1/2000 | Patel et al. .................. 455/414 |
| 6,020,981 A | * | 2/2000 | Ogiyama .................... 358/434 |
| 6,038,037 A | * | 3/2000 | Leung et al. ............... 358/434 |

* cited by examiner

Primary Examiner—Edward Coles
Assistant Examiner—Joseph R. Pokrzywa
(74) Attorney, Agent, or Firm—Kenyon & Kenyon

(57) ABSTRACT

A Fax system includes a sending fax machine, an intermediate fax machine operated by a fax forwarding service, and one or more receiving fax machines. A Job ID is generated to identify a fax message. The sending fax machine sends the fax message (e.g., a document) to the intermediate fax machine, and outputs a transmission report. The transmission report lists the Job ID. The fax message is forwarded to one or more intended recipients. The fax forwarding service provides the sender with a status report listing the Job ID and indicating whether the fax message was successfully forwarded.

18 Claims, 3 Drawing Sheets

JOB ID FOR FAX FORWARDING

CROSS-REFERENCE TO RELATED APPLICATIONS

This application is based on U.S. Provisional Application No. 60/036,059, filed Jan. 30, 1997.

TECHNICAL FIELD

The present invention relates to Facsimile (Fax) services, and more particularly to a technique for confirming whether a Fax document has been delivered from a Fax forwarding service to the intended recipient.

BACKGROUND OF THE INVENTION

Fax machines are in common use. They allow a user to transmit a document over standard phone networks.

A standard feature of fax machines is that the receiving (called) machine sends to the sending machine a character string, called the Called Subscriber Identification (CSI), that is supposed to identify the receiving machine. The standard allows a maximum of 20 characters, consisting of the 10 numeric characters, the + character and the space character. Most fax machines are also able to print upper case alpha-numerics even though this is not standardized.

Another common but not standardized feature is that, after sending a document, the sending machine emits a "transmission report" or "activity report" which records certain key information, such as the time of transmission, the called (or receiving) machine's number, the called machine's CSI, the number of pages, error conditions, etc. This transmission report may be a useful business or legal record. Commonly, the sender files the transmission report along with the transmitted document. If the transmission report indicates unsatisfactory quality or incomplete transmission, the sender may wish to retransmit the document.

It is sometimes desirable for the sending fax machine to communicate not directly with the intended receiving fax machine, but rather to communicate with a forwarding service. The forwarding service may provide features such as broadcast to multiple recipients, reduced cost, automatic retransmission in case of error or in case the receiver is busy, etc.

Commonly, the fax forwarding service eventually provides the sender with a status report listing. documents received and whether or not they have been forwarded to the intended recipients. This status report can be delivered by fax, electronic mail, etc.

This status report should not be confused with the transmission report emitted by the sender's fax machine. Although sometimes the transmission report can reflect the success or failure of the forwarding operation (e.g., when the document can be forwarded to the ultimate recipients while the original sender is still on the line), more typically the transmission report indicates only that the document was received by the forwarding service, not by the ultimate recipients (e.g., when there are multiple recipients, or where better or cheaper service can be achieved by delaying the forwarding).

However, presently, no satisfactory technique exists for accurately matching the transmission report with an entry of the status report. Rather, the sender is forced to make an educated guess to match each entry of the status report with each transmission report based on number of pages, time and date, etc. This can be difficult and error-prone process for confirming transmission of documents to the intended recipients.

Therefore, a need exists for a simple and accurate technique that allows the sender to confirm that a document was forwarded to the intended recipient.

SUMMARY OF THE INVENTION

The Fax system of the present invention includes a sending fax machine, an intermediate fax machine operated by a fax forwarding service, and one or more receiving fax machines. Each fax machine may be a standard fax machine, or may be a computer with a fax interface.

A fax call is placed from the sending fax machine to the intermediate fax machine. A Job ID is generated by the fax forwarding service, either in advance, or in response to the fax call. The intermediate fax machine answers the telephone call and sends its Called Station Identification (CSI) back to the sending fax machine. The CSI includes the generated Job ID as a sub-string. The sending fax machine sends a fax message (e.g., a document) to the intermediate fax machine, and outputs a transmission report. The transmission report lists the Job ID received from the intermediate fax machine to identify the fax message and indicates whether the fax message was successfully sent to the intermediate fax machine. The fax message (perhaps in modified form and/or combined with other information) is forwarded to one or more intended recipients. The fax forwarding service then provides the sender with a status report listing the job ID and indicating whether the fax message corresponding to the Job ID was successfully forwarded to the intended recipients. The sender can then confirm successful transmission of the original document by matching the Job ID on the status report to the Job ID on the transmission report.

DETAILED DESCRIPTION

Figure 1:
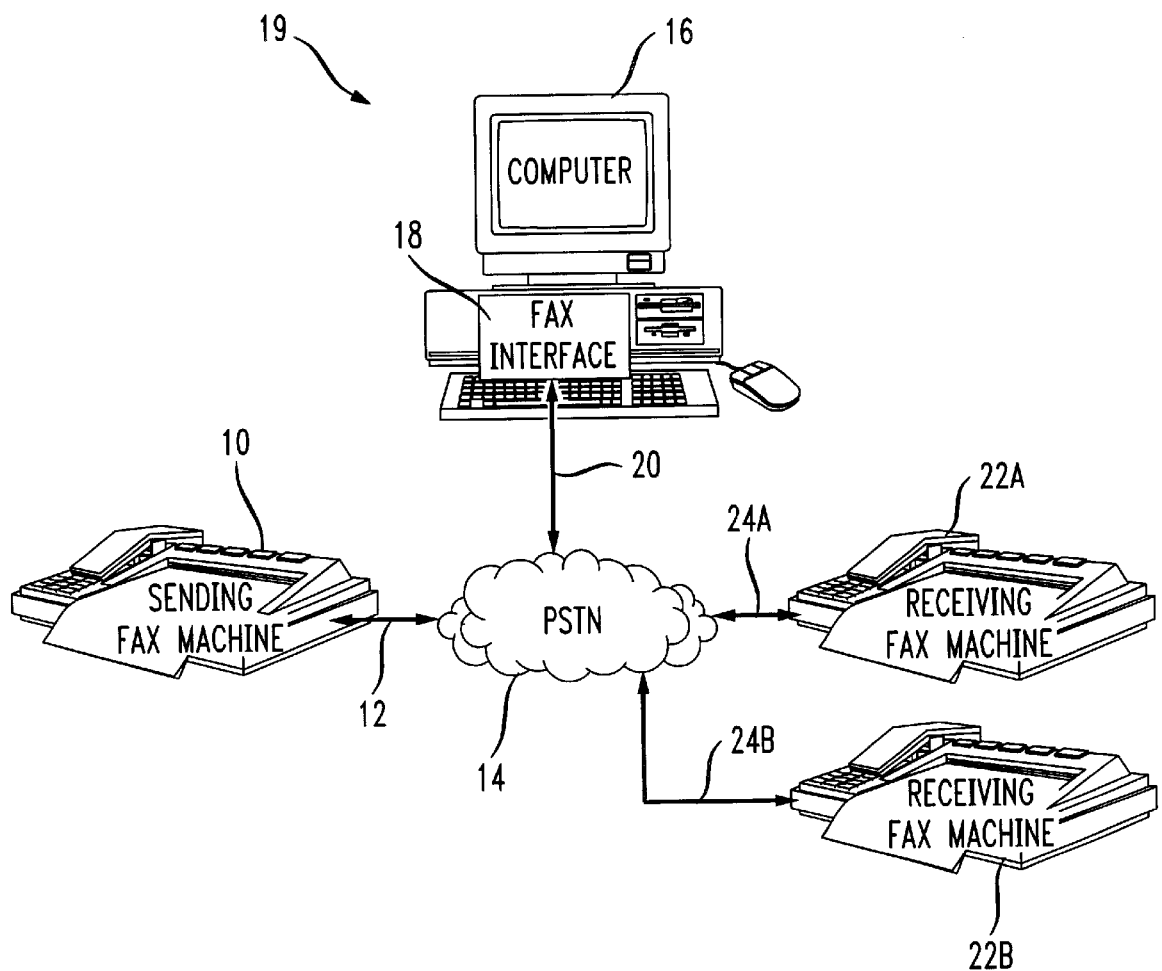
FIG. 1 is a block diagram of a fax system according to a first embodiment of the present invention.

Referring to the drawings in detail, wherein like numerals indicate like elements, FIG. 1 is a block diagram of a fax system according to a first embodiment of the present invention. A sending Fax machine 10 is connected to the Public Switched Telephone Network (PSTN) via line 12. Fax machine 10 can send and receive fax messages via PSTN 14.

One or more receiving fax machines 22A and 22B are connected to PSTN 14 via lines 24A and 24B, respectively. Fax machines 22A and 22B also can send and receive fax messages via PSTN 14.

An intermediate fax machine 19 is connected to PSTN 14 via line 20. Intermediate fax machine 19 includes a computer 16 and a fax interface 18. Computer 16 can be, for example, a personal computer (PC). Fax interface 18 can be, for example, a modem/fax card that is inserted into a card slot in computer 16 that allows computer 16 to emulate a fax machine. Computer 16 and fax interface 18 are used by a fax forwarding service for receiving fax messages from customers, and for forwarding the fax messages to intended recipients (such as receiving fax machines 22A and 22B). Also, fax machines 10, 22A and 22B can be standard fax machines, or can be computers with fax interfaces (similar to fax machine 19).

Computer 16, which may be located on the premises of the fax forwarding company, keeps track of all received and transmitted fax messages and controls the forwarding of these fax messages to the intended recipients. As described in greater detail below, computer 16 also confirms successful transmission of fax messages to the intended recipients, and notifies customers of this successful transmission via a delivery report or status report.

Figure 2:
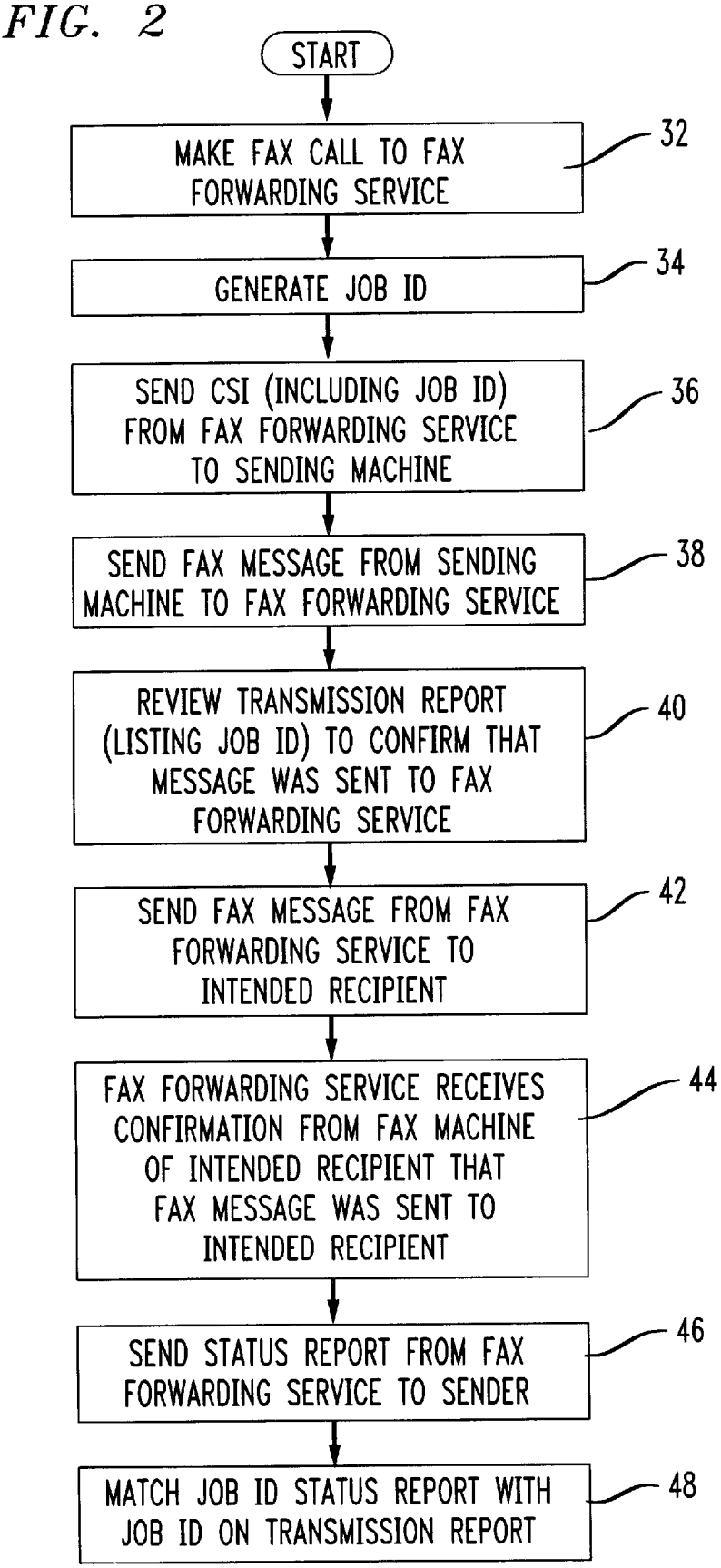
FIG. 2 is a flow chart illustrating an embodiment of the operation of the fax system of FIG. 1.

The operation of the fax system of FIG. 1 will now be described with reference to FIG. 2. FIG. 2 is a flow chart illustrating the operation of the fax system of FIG. 1.

At step 32, sending fax machine 10 makes a telephone call to establish a communications link between sending fax machine 10 and intermediate fax machine 19.

At step 34 computer 16 generates a unique Job ID to identify the fax message that will be sent from sending machine 10 to intermediate fax machine 19. The Job ID can be generated by computer 16 as a sequential number. For example, a Job ID of 101 may be used to identify one fax message transmitted from sending machine 10. A Job ID of 102 may be used to identify the next fax message transmitted from sending machine 10 (or from another machine). In this manner, each Job ID uniquely identifies a separate fax message (e.g., fax document) sent by sending fax machine 10.

Alternatively, the Job ID can be generated by computer 16 as a cryptologic function (such as the MD5 message-digest algorithm or some other hash function) based upon a secret number known only to the fax forwarding service (e.g., computer 16) and one or more of the following parameters: the time and date of the fax transmission or receipt, a sequence number, a client number identifying the. client, among other things. By using a secure cryptologic or hash function to encode the Job ID, it is difficult for a computer hacker to impersonate the fax forwarding service. Also, the use of the cryptologic function prevents the customer (sender) from determining (by analysis of the sequence numbers) how many faxes were being sent by the fax forwarding service. In addition, a different set of sequence numbers can be used for each customer (sender). The Job ID can be generated in real-time after receipt of the fax telephone call of step 32, or generated in advance.

At step 36, intermediate fax machine 19 answers the telephone call (of step 32) and sends its Called Station Identification (CSI) back to the sending fax machine 10. The CSI includes the generated Job ID as a sub-string that is used to identify the fax message or document (sent at step 38, described below).

Alternatively, intermediate fax machine 19 can send the Job ID as part of its Digital Identification Signal (DIS), which is a data string that identifies the fax capabilities and optional fax features of fax machine 19. Other signals may be used to transmit the Job ID from intermediate fax machine 19 to sending fax machine 10. Also, a bit in the DIS can be used to identify the Job ID as a feature provided by fax machine 19.

At step 38, after receiving the CSI and the DIS from fax machine 19, sending fax machine 10 sends the fax message (e.g., the document to be forwarded to the intended recipient) to intermediate fax machine 19. A distribution list is provided from the sender (e.g., the sending fax machine 10) to the computer 16 via fax, E-mail, verbally over the telephone, or by using other available communication techniques. The distribution list identifies at least the names and fax telephone numbers of one or more intended recipients of the fax message. Computer 16 temporarily stores the fax message and the distribution list. Computer 16 can also store additional information regarding the sender, including the sender's E-mail address (provided by the sender earlier), and the fax number of the sending fax machine 10 (provided earlier or provided from sending machine 10 to machine 19 during the fax protocol or handshake).

Using standard fax protocols, the intermediate fax machine 19 then sends a Message Confirmation (MCF) signal to the sending fax machine 10 confirming that the fax message or document was received successfully. Sending fax machine 10 then sends a Disconnect (DCN) signal and both machine 10 and intermediate fax machine 19 disconnect from the telephone line.

A transmission report is printed out (or displayed on a display) from the sending fax machine 10. The transmission report can display a variety of fields, including identifying whether the fax message (or document) was successfully transmitted to intermediate fax machine 19, the number of pages, date and time of transmission, the Job ID provided by fax machine 19 corresponding to the fax message, and the CSI provided by. fax machine 19 which identifies intermediate fax machine 19 as the recipient. Typically, as a standard fax. feature, the CSI is automatically printed out on the transmission report. Therefore, no modification to sending fax machine 10 is required to print out the Job ID on the fax transmission report. The Job ID, as part of the CSI, will be printed out automatically when the CSI is printed on the transmission report.

However, if the Job ID is transmitted as part of the DIS or other signal, sending fax machine 10 must be modified to decode the signal to identify the Job ID, and print out the Job ID on the transmission report (which would be printed separately from the CSI on the transmission report).

At step 40, the transmission report is reviewed to confirm that the message was successfully sent to the intermediate fax machine 19 (the fax forwarding service). This can be done, for example, by manually reviewing the transmission report. If the transmission report is made available in electronic format, step 40 can be performed automatically by machine 10 or by a computer. If the document was successfully transmitted to intermediate fax machine 19, the transmission report can then be filed with the document that was faxed to the intermediate fax machine 19. Otherwise, if the document was not successfully transmitted, the document should be retransmitted to the intermediate fax machine 19 of the fax forwarding service (e.g., repeat steps 32–40). In such case, intermediate fax machine 19 would generate a new Job ID for the retransmitted document.

At step 42, the fax message received at intermediate fax machine 19 (from machine 10) is then forwarded to one or more intended recipients (receiving fax machines 22A, 22B, etc.) based on the distribution list provided to computer 16. This forwarding step may include a scheduled transmission (scheduled for a particular date and time by the sender), automatic retransmission, transmission at off-peak hours to reduce costs, and other features offered by fax forwarding services.

At step 44, intermediate fax machine 19 receives confirmation from the one or more intended recipients (receiving fax machines 22) that the fax message was successfully transmitted. For example, this confirmation can be provided in a conventional manner as a transmission report that is printed out by fax machine 19 after receiving a confirmation (MCF) signal from each intended recipient.

At step 46, fax machine 19 sends a status report or delivery report to the sender that lists each fax message by its Job ID, and indicates whether each fax message (or document) was successfully transmitted to the intended recipient. The status report can also include additional information for each fax message, including, the name and fax number of the intended recipient, date and time of the transmission to the recipient, the number of pages of the document, a billing number (provided by the sender on the distribution list to allow the sender to keep track of charges), etc. The status report can be sent from the fax forwarding service to the sender via fax (e.g., to fax machine 10), to the sender's E-mail address via the Internet, or by other available communications techniques.

At step 48, the sender can match the Job IDs on the status report with the Job IDs on each transmission report (output by sending machine 10) to identify which fax messages (documents) were successfully forwarded to the intended recipients. The sender may resend to the forwarding service (e.g., to fax machine 19) any documents not successfully delivered to the intended recipients. The comparison of the Job IDs on the status report to the Job IDs on each transmission report can be performed manually. Alternatively, this process can be performed automatically by a computer if the status report and transmission reports are provided in a suitable format (such as an electronic format).

Figure 3:
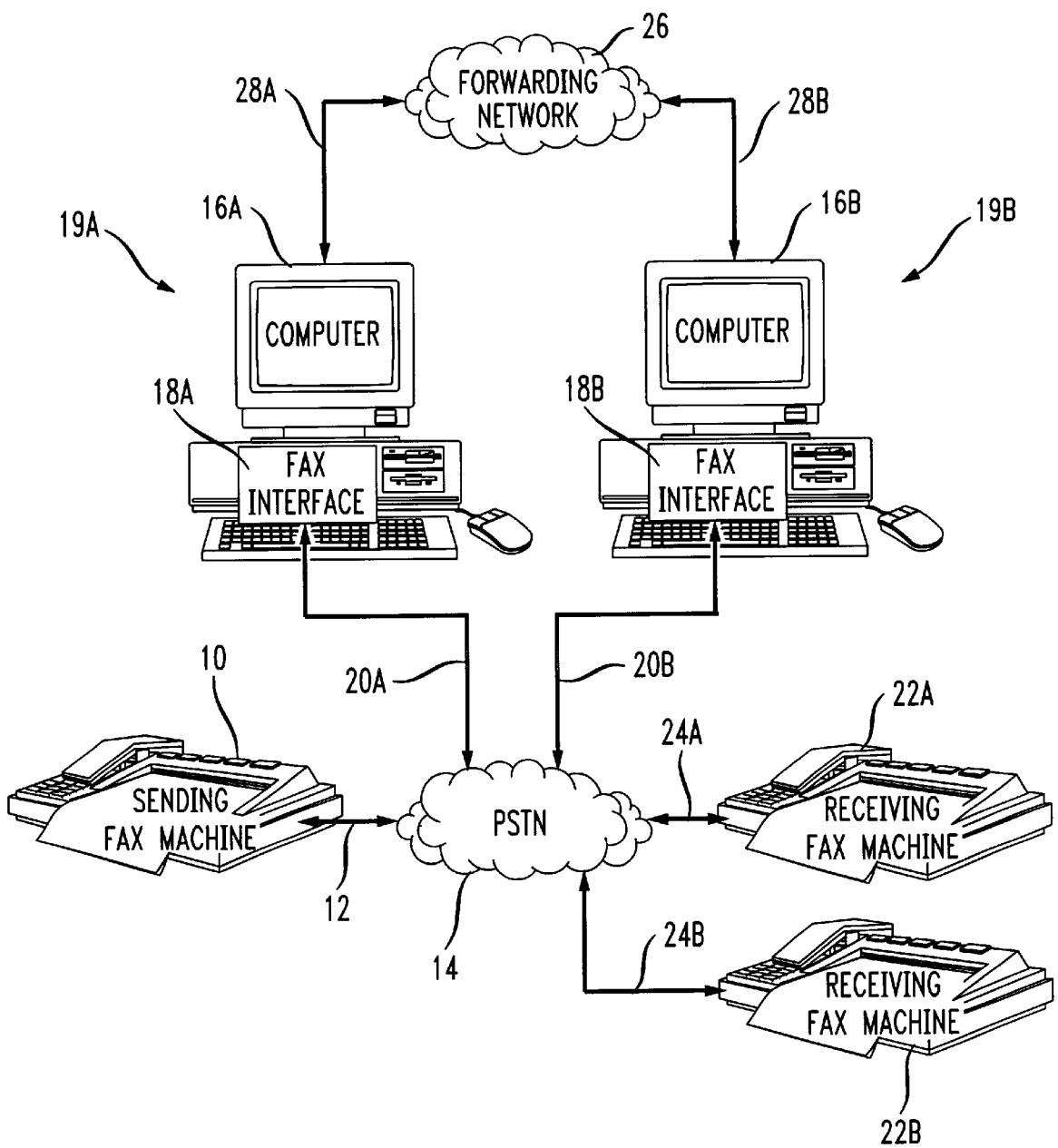
FIG. 3 is a block diagram of a fax system according to a second embodiment of the present invention.

FIG. 3 is a block diagram of a fax system according to a second embodiment of the present invention. The fax system of FIG. 3 is the same as the system of FIG. 1, except that the system of FIG. 3 includes two intermediate fax machines 19A and 19B. Intermediate fax machine 19A and 19B include computers 16A and 16B, respectively, and fax interfaces 18A and 18B, respectively. Intermediate fax machines 19A and 19B are connected to PSTN 14 via lines 20A and 20B, respectively. Computers 16A and 16B are connected together via forwarding network 26, and lines 28A and 28B. Forwarding network 26 can be, for example, a packet switched.network, such as the Internet or the like.

Intermediate fax machines 19A and 19B can each operate in parallel to receive and forward fax messages as described above for the system of FIG. 1. In addition, intermediate fax machines 19A and 19B can work together to receive and forward fax messages. For example, intermediate fax machine 19A can be used only to receive incoming fax messages from customers. These fax messages are then forwarded from computer 16A via forwarding network 26 to computer 16B. Fax interface 18B then forwards the fax message to the intended recipients based on the distribution list provided from the sender.

According to a third embodiment of the present invention, the job ID is generated at the sender's fax machine. A sufficiently long Pseudo-random number is used as a job ID. The rest of the procedure for this embodiment is similar to the other embodiments.

What is claimed is:

1. A method of transmitting a fax message from a sender to one or more intended recipients via a fax forwarding service, said method comprising the steps of:

generating a Job ID;

communicating the Job ID, as a sub-string that is used to identify the fax message in at least one of a Called Station Identification (CSI) and a Digital Identification Signal (DIS), between the fax forwarding service and the sender;

receiving passively, without the need for a prompt, the fax message corresponding to the Job ID at the fax forwarding service from the sender;

sending a confirmation from the fax forwarding service to the sender confirming that the fax message was successfully received by the fax forwarding service;

forwarding automatically the fax message from the fax forwarding service to one or more intended recipients; and providing a status report from the fax forwarding service to the sender, the status report listing the Job ID for the fax message and indicating whether or not the fax message corresponding to the Job ID was successfully forwarded to the one or more intended recipients.

2. The method of claim 1 and further comprising the step of outputting at the sender a transmission report indicating whether or not the fax message was successfully sent to the fax forwarding service, the transmission report listing the Job ID corresponding to the fax message.

3. The method of claim 1 wherein the step of generating the Job ID comprises the step of generating the Job ID at the fax forwarding service, and the step of communicating comprises sending the Job ID from the fax forwarding service to the sender.

4. The method of claim 1 wherein said step of generating the Job ID comprises generating the Job ID at the sender, and the step of communicating the Job ID comprises sending the Job ID from the sender to the fax forwarding service.

5. The method of claim 1 wherein said step of generating comprises the step of generating the Job ID as a random number.

6. The method of claim 1 wherein said step of generating comprises the step of generating the Job ID as a sequential number.

7. The method of claim 6 wherein said step of generating comprises the step of generating the Job ID as a cryptologic function based upon a secret number known only to the fax forwarding service and one or more of the following parameters: the time and date of the fax transmission, a sequence number, and a client number identifying the client.

8. The method of claim 2 wherein said step of outputting a transmission report comprises the step of printing at the sender a transmission report indicating whether or not the fax message was successfully sent to the fax forwarding service, the transmission report listing the Job ID corresponding to the fax message.

9. The method of claim 2 wherein said step of outputting a transmission report comprises the step of displaying on a display at the sender a transmission report indicating whether or not the fax message was successfully sent to the fax forwarding service, the transmission report listing the Job ID corresponding to the fax message.

10. The method of claim 1 wherein said step of providing a status report comprises the step of providing a status report from the fax forwarding service to the sender via fax, the status report listing the Job ID for the fax message and indicating whether or not the fax message corresponding to the Job ID was successfully forwarded to the one or more intended recipients.

11. The method of claim 1 wherein said step of providing a status report comprises the step of providing a status report from the fax forwarding service to the sender via E-mail, the status report listing the Job ID for the fax message and indicating whether or not the fax message corresponding to the Job ID was successfully forwarded to the one or more intended recipients.

12. The method of claim 2 and further comprising the step of matching the Job ID on the status report to the Job ID listed on the transmission report to confirm that a document was successfully forwarded to the one or more intended recipients.

13. The method of claim 1 wherein said step of forwarding comprises the steps of:

receiving a distribution list at the fax forwarding service from the sender for the fax message, the distribution list including a list of intended recipients; and forwarding the fax message from the fax forwarding service to the intended recipients listed on the distribution list.

14. A method of transmitting a fax message from a sender to one or more intended recipients via a fax forwarding service, the sender having a sending fax machine, the fax forwarding service having an intermediate fax machine, said method comprising the steps of:

generating a Job ID corresponding to a fax message;

establishing a communications link between the intermediate fax machine and the sending fax machine, and performing the following steps over said communications link:

a) communicating the Job ID, as a sub-string that is used to identify the fax message in at least one of a Called Station Identification (CSI) and a Digital Identification Signal (DIS), between the intermediate fax machine and the sending fax machine; and b) receiving passively, without the need for a prompt, the fax message corresponding to the Job ID at the intermediate fax machine from the sending fax machine;

providing a transmission report at the sending fax machine indicating whether or not the fax message was successfully sent to the intermediate fax machine, the transmission report listing the Job ID corresponding to the fax message;

forwarding the fax message from the intermediate fax machine to one or more intended recipients; and providing a status report from the fax forwarding service to the sender, the status report listing the Job ID for the fax message, said status report indicating whether or not the fax message corresponding to the Job ID was successfully forwarded to the one or more intended recipients.

15. The method of claim 14 wherein said sending fax machine comprises a computer and a fax interface.

16. The method of claim 14 wherein said intermediate fax machine comprises a computer and a fax interface.

17. A method of transmitting a fax message from a sender to one or more intended recipients via a fax forwarding service, the sender having a sending fax machine, the fax forwarding service having a first and a second intermediate fax machines, said method comprising the steps of:

generating a Job ID at the fax forwarding service corresponding to a fax message;

establishing a communications link between the first intermediate fax machine and the second intermediate fax machine, and performing the following steps over said communications link:

a) sending the Job ID, as a sub-string that is used to identify the fax message in at least one of a Called Station Identification (CSI) and a Digital Identification Signal (DIS), from the first intermediate fax machine and the second intermediate fax machine; and b) receiving passively, without the need for a prompt, the fax message corresponding to the Job ID at the first intermediate fax machine from the sending fax machine;

outputting a transmission report at the sending fax machine indicating whether or not the fax message was successfully sent to the first intermediate fax machine, the transmission report listing the Job ID corresponding to the fax message;

forwarding the fax message from the first intermediate fax machine to the second intermediate fax machine;

forwarding the fax message from the second intermediate fax machine to one or more intended recipients; and providing a status report from the fax forwarding service to the sender, the status report listing the Job ID for the fax message, said status report indicating whether or not the fax message corresponding to the Job ID was successfully forwarded from the fax forwarding service to the one or more intended recipients.

18. An apparatus for transmitting a fax message from a sender to one or more intended recipients via a fax forwarding service, said apparatus comprising:

means for generating a Job ID at the fax forwarding service;

means for sending the Job ID, as a sub-string that is used to identify the fax message in at least one of a Called Station Identification (CSI) and a Digital Identification Signal (DIS), from the fax forwarding service to the sender;

means for passively receiving the fax message, without the need for a prompt, corresponding to the Job ID at the fax forwarding service from the sender;

means for outputting at the sender a transmission report indicating whether or not the fax message was successfully sent to the fax forwarding service, the transmission report listing the Job ID corresponding to the fax message;

means for automatically forwarding the fax message from the fax forwarding service to one or more intended recipients, and means for providing a status report from the fax forwarding service to the sender, the status report listing the Job ID for the fax message and indicating whether or not the fax message corresponding to the Job ID was successfully forwarded to the one or more intended recipients.

* * * * *